(12) United States Patent
Rodgers et al.

(10) Patent No.: US 8,417,931 B2
(45) Date of Patent: *Apr. 9, 2013

(54) METHOD AND SYSTEM FOR NAND FLASH SUPPORT IN AN AUTONOMOUSLY LOADED SECURE REPROGRAMMABLE SYSTEM

(75) Inventors: Stephane Rodgers, San Diego, CA (US); Andrew Dellow, Minchinhampton (GB); Xuemin Chen, San Diego, CA (US); Iue-Shuenn Chen, San Diego, CA (US); Qiang Ye, Tustin, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/034,176

(22) Filed: Feb. 24, 2011

(65) Prior Publication Data

US 2011/0197054 A1    Aug. 11, 2011

Related U.S. Application Data

(63) Continuation of application No. 11/746,773, filed on May 10, 2007, now Pat. No. 7,900, 032.

(60) Provisional application No. 60/828,544, filed on Oct. 6, 2006.

(51) Int. Cl.
*G06F 9/00* (2006.01)
*H04L 9/00* (2006.01)

(52) U.S. Cl. .............. 713/2; 713/193; 713/194; 726/26; 726/27; 726/28; 726/29; 726/30

(58) Field of Classification Search .................. 713/2
See application file for complete search history.

(56) References Cited

U.S. PATENT DOCUMENTS

| 7,284,085 | B2 | 10/2007 | Netter et al. |
| 7,610,433 | B2 | 10/2009 | Randell et al. |
| 7,900,032 | B2 | 3/2011 | Rodgers et al. |
| 2005/0005098 | A1* | 1/2005 | Michaelis et al. ............ 713/156 |

OTHER PUBLICATIONS

Non Final Office Action, dated Apr. 15, 2010, for U.S. Appl. No. 11/746,773, filed May 10, 2007; 8 pages.
Notice of Allowance, dated Sep. 7, 2010, for U.S. Appl. No. 11/746,773, filed May 10, 2007; 12 pages.

* cited by examiner

*Primary Examiner* — Longbit Chai
(74) *Attorney, Agent, or Firm* — Sterne, Kessler, Goldstein & Fox P.L.L.C.

(57) ABSTRACT

A boot code may be segmented to allow separate and independent storage of the code segments in a manner that may enable secure system boot by autonomous fetching and assembling of the boot code by a security sub-system. The code fetching may need to be done without the main CPU running on the chip for security reasons. Because the boot code may be stored in memory devices that require special software application to account for non-contiguous storage of data and/or code, for example a NAND flash memory which would require such an application as Bad Block Management, code segments stored in areas guaranteed to be usable may enable loading remaining segment separately and independently. Each of the code segments may be validated, wherein validation of the code segments may comprise use of hardware-based signatures.

29 Claims, 4 Drawing Sheets

METHOD AND SYSTEM FOR NAND FLASH SUPPORT IN AN AUTONOMOUSLY LOADED SECURE REPROGRAMMABLE SYSTEM

CROSS-REFERENCE TO RELATED APPLICATIONS/INCORPORATION BY REFERENCE

This application is a continuation of U.S. patent application Ser. No. 11/746,773, filed on May 10, 2007 (now U.S. Pat. No. 7,900,032), which makes reference to, claims priority to, and claims the benefit of U.S. Provisional Application Ser. No. 60/828,544 filed on Oct. 6, 2006.

The above stated application is hereby incorporated by reference in its entirety.

FIELD OF THE INVENTION

Certain embodiments of the invention relate to system security. More specifically, certain embodiments of the invention relate to a method and system for NAND flash support in an autonomously loaded secure reprogrammable system.

BACKGROUND OF THE INVENTION

In an increasingly security-conscious world, protecting access to information and/or to systems from unwanted discovery and/or corruption is a major issue for both consumers and businesses.

The growth of system connectivity has been one of the major developments in recent years. Fewer and fewer systems are operating as stand-alone boxes, and most of today's systems are increasingly becoming elements of complex networks. This growth in networking allows improved performance and increased flexibility. However, with this growth in system distribution, system security, and protection against unwanted access and/or corruption, has become a major concern for systems owners and/or operators. Many consumers and systems owners and/or operators may be vulnerable to unwanted access when the level of security provided within the system is insufficient for providing the appropriate protection. In that regard, many deployed systems, may incorporate the use of architectures that enable and improve security management in order to provide the necessary protection from unwanted access.

Many systems have dedicated security sub-systems, which in addition to monitoring the system security throughout its operations, may also function to ensure that the systems are initially loaded securely. These systems may also comprise processing units, which may be required to perform general processing functions including, but not limited to, loading code and/or data, performing code validation, executing code instructions, and performing memory manipulations. If the system is to be loaded securely, such processing unit need to be assured that it is executing clean code. Therefore, such processing unit may not be running during initial boot stages, and consequently, some of the functionality provided by the processing unit, including, but not limited to, memory operations, may not be available during early boot stages.

Secure system boot would require loading boot code sets that may be stored in memory. Some memory devices, including for example NAND flash memory devices, may utilize block structure, wherein internal space within these devices may be segmented into block causing data stored in these memory devices that may exceed block size to be stored in different blocks. Also, with such memory devices, some of these blocks may be unusable causing data stored in these devices to span non-contiguous blocks at times. Typically such situations are remedied using specific software operations that mask the internal storing details of these memory devices.

For example, a NAND flash memory, which may utilize internal block structure, may be arranged in block sizes from 8 k to 128 k (currently), and only the first block is guaranteed to be useable. When data is stored in NAND flash memory, and the size of data exceeds available space in a single block, the data may be stored in multiple blocks that may not necessarily be contiguous. A MIPS-based system incorporating a NAND flash memory for example may use specific software management scheme to manage such NAND flash memory limitations. One such software management scheme is Bad Block Management (BBM) wherein a mapping of different block locations associated with some data is maintained by a software application allowing the system to load the data as a whole regardless of the detail of the storage within the NAND flash memory (which blocks are actually used to store the different parts). Therefore, an application such as BBM would mask the fragmented details of storage within a memory device such as a NAND flash memory allowing the system to operate as if the data was being loaded as a whole.

Such approach, while practical in most situations, poses a problem during secure system boots. As stated above, during early phases of secure system boots it may be necessary to prevent and/or limit the processing unit operation while the integrity and security of the system is assured. It may be possible the boot code set necessary to allow the system to boot up and perform security operations during early phases of secure system boot may exceed the available area in such the guaranteed block in the NAND flash memory, and some of this boot code set may be stored in other, non-contiguous, blocks. Without the processing unit, the software applications that would allow use of Bad Block Management, for example, may not be available. Therefore, security code that need be loaded to assure the system security and integrity may not be available without the use of the processing unit that may not available during these early phases of secure system boots.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an autonomously loaded secure system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for NAND flash support in an autonomously loaded secure reprogrammable system. Exemplary aspects of a method and system for ensuring secure system boot, may comprise segmenting a boot code into various segments that may be stored and validated separately. The segmented boot code may be stored in a memory, such as a NAND flash memory 402. Since NAND flash memory devices incorporate block structure, with only the first block guaranteed to be usable, only some of the segments of the boot code may be stored in the guaranteed area of the NAND flash memory. The segments stored in the guaranteed area of the NAND flash memory may comprise information that enable locating and validating remaining segments separately. These remaining segments may not be stored in guaranteed areas of the NAND flash memory, and may be stored in non-contiguous blocks.

During secure system boots, a main CPU may be restricted while the system's security may be assured. A security subsystem may load the boot code necessary to perform system boot in a secure manner by fetching block 0 of the NAND flash memory, which is always guaranteed to be usable, and using segments of boot code stored in block 0, the guaranteed area, to assemble the boot code. Using the segments in the guaranteed area may enable the security sub-system to locate each of remaining segments of boot code that may be stored in other blocks of the NAND flash memory, and validate these segments separately.

Figure 1:
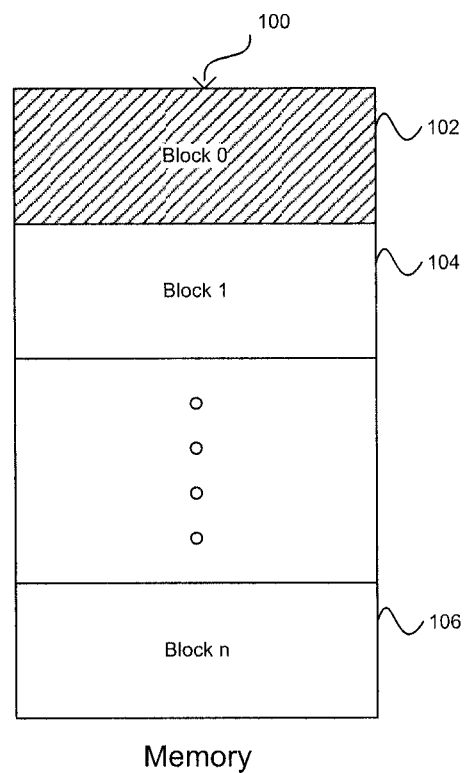
FIG. 1 is a block diagram illustrating an exemplary memory, in connection with an embodiment of the invention.

FIG. 1 is a block diagram illustrating an exemplary NAND flash memory, in connection with an embodiment of the invention. Referring to FIG. 1, there is shown a memory device 100, a block (0) 102, a block (1) 104, and a block (n) 106.

The memory device 100 may comprise suitable logic, circuitry and/or code that may enable storage of code and data. The internal space of memory device 100 is segmented into blocks; block (0), block (1), . . . , block (n).

In operation, the memory device 100 utilizes a block architecture wherein internal storage space within the memory device 100 is segmented into blocks; block (0), block (1), . . . , block (n). Only one block is always guaranteed to be usable for storing. Block (0) is a guaranteed block. Data and/or code stored in memory device 100 that may not fit in block (0) are stored in one or more other blocks. Software management of memory may be needed to track and determine where specific data and/or code may be stored (in which blocks).

Figure 2:
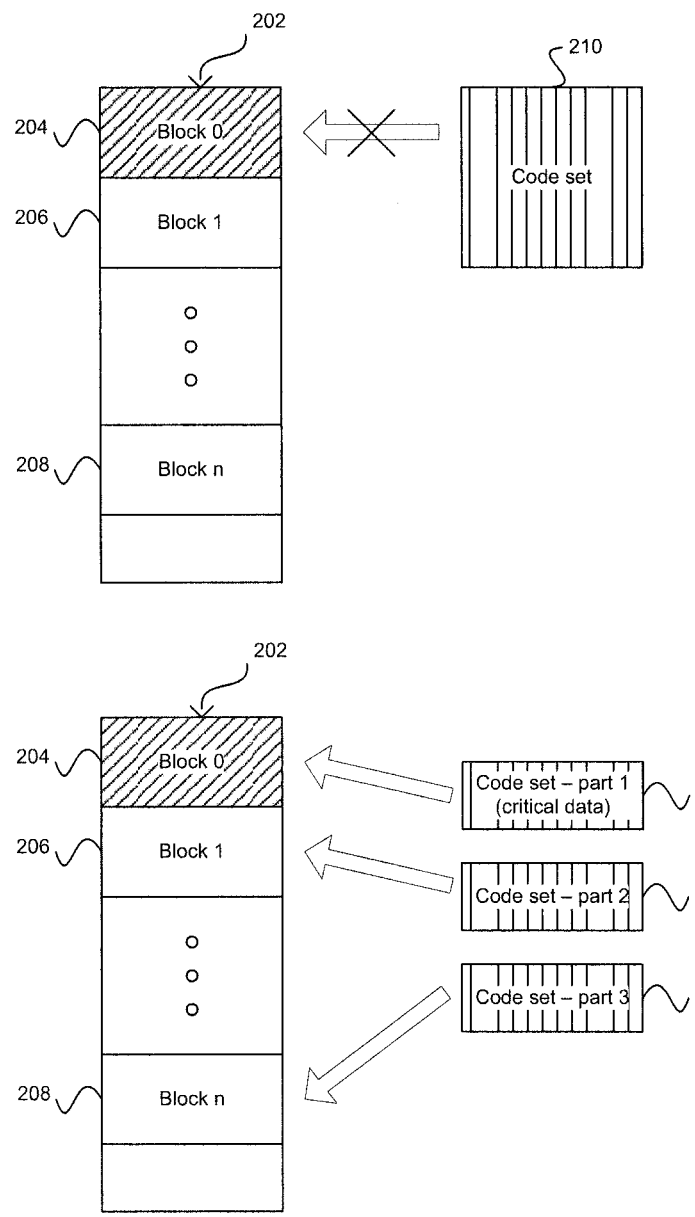
FIG. 2 is a block diagram illustrating an exemplary memory storage situation, in connection with an embodiment of the invention.

FIG. 2 is a block diagram illustrating an exemplary memory storage situation, in connection with an embodiment of the invention. Referring to FIG. 2, there is shown a memory device 202, a block (0) 204, a block (1) 206, a block (n) 208, a code set 210, a code set-part (1) 212, a code set-part (2) 214, and a code set-part (3) 216.

The memory device 202 may comprise suitable logic, circuitry and/or code that may enable storage of code and data. The internal space of memory device 202 may utilize block structure, and may comprise block (0) 204, block (1) 206, . . . , block (n) 208. The code set 210 may comprise a set of code instructions and/or necessary data that may perform a task. The code set-part (1) 212 comprises critical data in connection with code set 210. The code set-part (1) 212 may comprise a sub-set of code set 210, and may also comprise additional data, which may include information that enables locating other code set parts, and may also enable validating each part of code set separately and independently. The code set-part (2) 214 comprises a sub-set of code set 210. The code set-part (3) 216 comprises a sub-set of code set 210.

In operation, the memory device 202 performs as the memory device 100 described in FIG. 1.

As demonstrated, the code set 210 may not fit completely into block (0) 204, which is the only guaranteed block in memory device 202. The code set 210 may be partitioned onto code set-part (0) 212, code set-part (1) 214, and code set part (2) 216. The code set-part (0) may be stored in block (0) 204, which is a guaranteed area in memory device 202.

When code set-part (0) 212 is loaded from block (0) 204, the critical data may be used to locate remaining parts of the code set 210—i.e., code set-part (2) 214 and code set-part (3) 216. The critical data may also allow validating the code sub-set in code set-part (1) 212, the code set-part (2) 214, and code set-part (3) 216 independently and separately. Therefore, accessing the guaranteed block, block (0) 204, would allow autonomous loading of code set 210—i.e., without use of specific software application to account for block structure of memory device 202.

Figure 3:
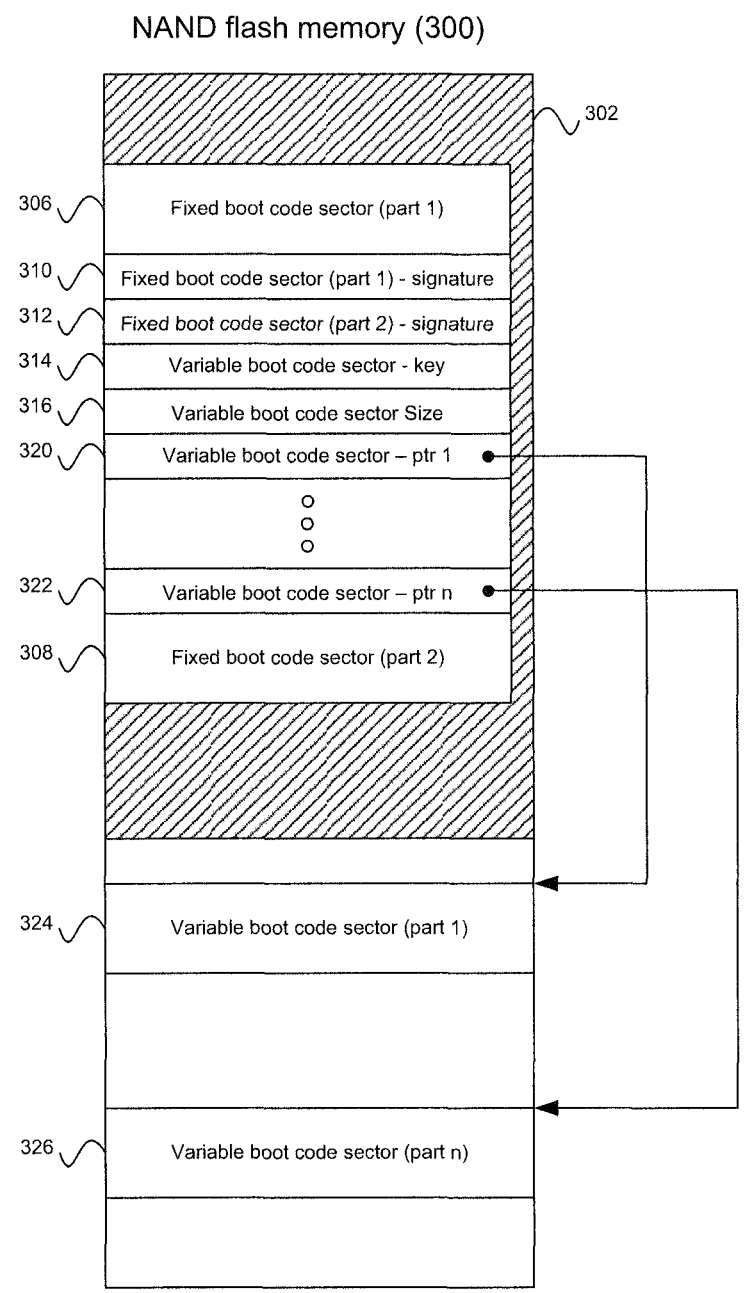
FIG. 3 is a block diagram illustrating an exemplary structuring of a boot code set within a guaranteed area of a NAND flash memory, which may be utilized in accordance with an embodiment of the invention.

FIG. 3 is a block diagram illustrating an exemplary structuring of a security code set within a guaranteed area of a NAND flash memory, which may be utilized in accordance with an embodiment of the invention. Referring to FIG. 3, there is shown a NAND flash memory 300, a block (0) 302, a fixed boot sector (part 1) 306, a fixed boot sector (part 2) 308, a fixed boot sector (part 1) signature 310, a fixed boot sector (part 2) signature 312, a variable boot code sector key 314, a variable boot code sector size 316, a variable boot code sector (pointer 1) 320, a variable boot code sector (pointer n) 322, a variable boot code sector (part 1) 324, and a variable boot code sector (part n) 326.

NAND flash memory 300 may comprise suitable logic, circuitry and/or code that may enable storage of code and data. The internal space of the NAND flash memory 300 may utilize block structure, and may comprise block (0) 302. Block (0) 302 may comprise the guaranteed block of the NAND flash memory 300—i.e., the only block always guaranteed to be usable.

The fixed boot sector (part 1) 306, the fixed boot sector (part 2) 308, the boot sector (part 1) 324, . . . , the variable boot code sector (part n) 326 may cumulatively comprise the boot code set, which may comprise instructions and/or necessary data that may allow booting up a system and/or device and performing necessary security operations. The fixed boot sector (part 1) signature 310 comprises information that may allow validating the fixed boot sector (part 1) 306. The fixed boot sector (part 2) signature 312 comprises information that may allow validating the fixed boot sector (part 2) 308. The variable boot code sector size 316 may comprise information that may allow determining size of variable code set sector—i.e., combined sizes of all parts of the variable boot code—i.e., the variable boot code sector (part 1) 324, . . . , the variable boot code sector (part 1) 326. The variable boot code sector (pointer 1) 320 comprises information that may allowing locating the variable boot code sector (part 1) 324—i.e., a block in the NAND flash memory 300 where the variable boot code sector (part 1) 324 is stored. The variable boot code sector (pointer n) 322 comprises information that may allowing locating the variable boot code sector (part n) 326—i.e., a block in the NAND flash memory 300 where the variable boot code sector (part n) 326 is stored.

In operation, block (0) 302 may be loaded autonomously because it is the guaranteed block in the NAND flash memory 300—i.e., block (0) 302 is always usable. The fixed boot code sector (part 1) 306 may be validated using the fixed boot code sector (part 1) signature 310. The fixed boot code sector (part 2) 308 may be validated using the fixed boot code sector (part 2) signature 312. The variable boot code sector, which comprises remaining boot code sector parts stored in the NAND flash memory 300, but not in the block (0) 302, may be assembled by using the variable boot code sector size 316, and the variable boot code sector (pointer 1) 320, . . . , the variable boot code sector (pointer n) 322, to locate the variable boot code sector (part 1) 324, . . . , the variable boot code sector (part n) 326. The variable boot code sector may be validated by using the variable boot code sector key 314. Once the variable boot code sector and the fixed boot code sector are validated, they may be combined to obtain the boot code set.

Figure 4:
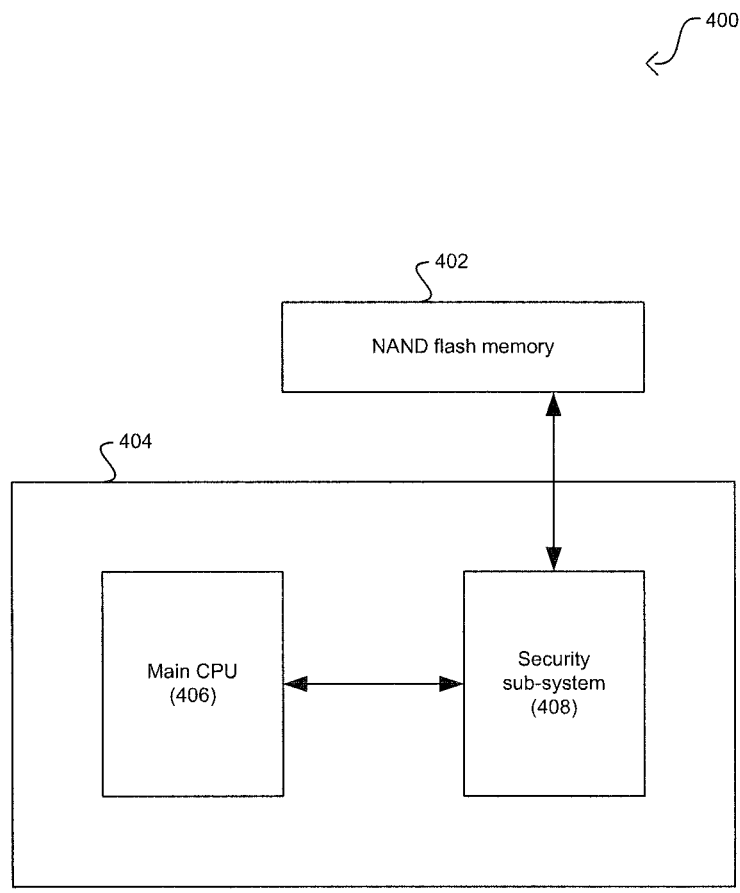
FIG. 4 is a block diagram illustrating an exemplary system with a NAND flash memory, which may be utilized in accordance with an embodiment of the invention.

FIG. 4 is a block diagram illustrating an exemplary system with a NAND flash memory, which may be utilized in accordance with an embodiment of the invention. Referring to FIG. 4, there is shown a NAND flash memory 402, a processor system 404, a main-CPU 406, and a security sub-system 408.

The NAND flash memory 402 may comprise suitable logic, circuitry and/or code that may enable storage of code and data used by the processor system 404. The processing system 404 may comprise a main-CPU 406, a security sub-system 408, and suitable logic, circuitry and/or code that may enable processing operations. The invention may not be limited to a specific processor, but may comprise for example, a general purpose processor, a specialized processor or any combination of suitable hardware, firmware, software and/or code, which may be enabled to provide NAND flash support for secure and autonomous boot code loading in accordance with the various embodiments of the invention.

The main-CPU 406 may comprise suitable logic, circuitry and/or code that may enable said processing operations. The security sub-system 408 may comprise suitable hardware, firmware, software and/or code, which may be enabled to provide security operations.

In operations, the NAND flash memory 402 operates similar to NAND flash memory 300 described in FIG. 3. The processor system 404 may perform various processing operations, which may include, but is not limited to, memory operations.

The security sub-system 408 may perform security operations that restrict and control the processor system 404 in certain security situation, including, but not limited to, secure and autonomous boot code loading.

The security sub-system 408 may load code and/or data from the guaranteed block in the NAND flash memory. The security sub-system 408 may load a boot code from the NAND flash memory. The security sub-system 408 may assemble the boot code by loading the boot code sectors either directly from the guaranteed block of the NAND flash memory, or by using the pointers stored in the guaranteed block to locate the parts stored in non-guaranteed blocks. The security sub-system 408 may use the signatures stored in the guaranteed block to validate the code set sectors separately. The security sub-system may execute the boot code to assure system security and integrity.

Various embodiments of the invention may comprise a method and system for ensuring secure system boot, and may comprise segmenting a boot code into various segments that may be stored and validated separately. The segmented boot code may be stored in a memory, such as a NAND flash memory 402. Because NAND flash memory devices incorporate block structure, with only the first block guaranteed to be usable, only some of the segments of the boot code may be stored in the guaranteed area of the NAND flash memory 402. The segments stored in the guaranteed area of the NAND flash memory 402 comprise information that enable locating and validating remaining segments separately. These remaining segments may not be stored in guaranteed areas of the NAND flash memory 402, and may be stored in non-contiguous blocks. During secure system boots, the main CPU 406 may be restricted while the system's security may be assured. A security sub-system 408 may load the boot code necessary to perform system boot in secure manner by fetching block 0 of the NAND flash memory 402, which is always guaranteed to be usable, and using segments of boot code stored in block 0, the guaranteed area, to assemble the boot code. Using the segments in the guaranteed area may enable the security sub-system 408 to locate each of remaining segments of boot code that may be stored in other blocks of the NAND flash memory, and validate these segments separately.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    segmenting a boot code into a plurality of code segments, wherein each of said plurality of code segments is separately stored in a memory comprising at least one non-guaranteed block; and
    loading said boot code based on code located in a guaranteed block of said plurality of code segments, wherein said code located in said guaranteed block is executed to locate segments stored in said at least one non-guaranteed block so as to assemble said boot code.

2. The method according to claim 1, further comprising storing said plurality of code segments in a predefined location in said memory.

3. The method according to claim 1, further comprising storing said plurality of code segments in a guaranteed block in said memory.

4. The method according to claim 1, further comprising using NAND flash memory as said memory.

5. The method according to claim 1, further comprising using a fixed sector and a variable sector as said plurality of code segments.

6. The method according to claim 1, further comprising storing said plurality of code segments in non-contiguous areas of said memory.

7. The method according to claim 1, further comprising validating each of said plurality of code segments using hardware-based signatures.

8. A method, comprising:
assembling, using a processing device, a plurality of code segments of a boot code based on code located in a guaranteed block of said plurality of code segments, wherein said code located in said guaranteed block is executed to separately locate each of remaining segments of said plurality of code segments stored in a memory comprising at least one non-guaranteed block which is not guaranteed to be usable; and
executing, using the processing device, said assembled plurality of code segments.

9. The method in claim 8, further comprising storing said plurality of code segments in non-contiguous areas of said memory.

10. The method in claim 8, further comprising using NAND flash memory as said memory.

11. A system, comprising:
a segmenting device configured to segment a boot code into a plurality of code segments, wherein each of said plurality of code segments is separately stored in a memory comprising at least one non-guaranteed block; and
said segmenting device is configured to load said boot code based on code located in a guaranteed block of said plurality of code segments, wherein said boot code located in said guaranteed block is configured to locate segments stored in said at least one non-guaranteed block so as to assemble said boot code.

12. The system in claim 11, wherein said segmenting device is configured to said plurality of code segments in a predefined location in said memory.

13. The system in claim 11, wherein said segmenting device is configured to store said plurality of code segments in a guaranteed block in said memory.

14. The system in claim 11, wherein said memory comprises NAND flash memory.

15. The system in claim 11, wherein said plurality of code segments comprises a fixed sector and a variable sector.

16. The system in claim 11, wherein said plurality of code segments is stored in non-contiguous areas of said memory.

17. The system in claim 11, wherein said segmenting device is configured to validate each of said plurality of code segments using hardware-based signatures.

18. The system of claim 11, wherein the segmenting device comprises a processor or a circuit.

19. A system, comprising:
an assembling device configured to assemble a plurality of code segments of a boot code, wherein code located in a guaranteed block of said plurality of code segments is configured to separately locate each of remaining segments of said plurality of code segments stored in a memory comprising at least one non-guaranteed block; and
said assembling device is configured to execute said assembled plurality of code segments.

20. The system in claim 19, wherein said plurality of code segments is stored in non-contiguous areas of a said memory.

21. The system in claim 19, wherein said memory comprises NAND flash memory.

22. The system of claim 19, wherein the assembling device comprises a processor or a circuit.

23. A method, comprising:
booting a device by loading boot code from a plurality of code segments stored separately in a memory comprising at least one non-guaranteed block, and said booting comprises:
loading, based on code located in a guaranteed block of said plurality of code segments, said plurality of code segments from said memory independently of intervention by system software for said device, wherein said code is executed to locate segments stored in said at least one non-guaranteed block so as to assemble said boot code; and
executing instructions of said plurality of code segments.

24. The method according to claim 23, comprising storing said plurality of code segments in a predefined location in a said memory.

25. The method according to claim 23, comprising validating each of said plurality of code segments using hardware-based signatures.

26. A system, comprising a booting device configured to:
boot a device by loading boot code from a plurality of code segments stored separately in a memory comprising at least one non-guaranteed block; and
load, based on code located in a guaranteed block of said plurality of code segments, said plurality of code segments from said memory independently of intervention by system software for said device, wherein said code is configured to locate segments stored in said at least one non-guaranteed block so as to assemble said boot code; and
executing execute instructions of said plurality of code segments.

27. The system according to claim 26, wherein said plurality of code segments is stored in a predefined location in said memory.

28. The system according to claim 26, wherein each of said plurality of code segments is validated using of hardware-based signatures.

29. The system of claim 26, wherein the booting device comprises a processor or a circuit.

* * * * *

UNITED STATES PATENT AND TRADEMARK OFFICE
CERTIFICATE OF CORRECTION

PATENT NO. : 8,417,931 B2
APPLICATION NO. : 13/034176
DATED : April 9, 2013
INVENTOR(S) : Rodgers et al.

It is certified that error appears in the above-identified patent and that said Letters Patent is hereby corrected as shown below:

In the Claims:

Column 7, Line 19, please delete "which is not guaranteed to be usable".

Column 8, Line 46, please delete "executing".

Column 8, Line 52, please replace "using of" with --using--.

Signed and Sealed this
Fourth Day of June, 2013

Teresa Stanek Rea
*Acting Director of the United States Patent and Trademark Office*